(12) United States Patent
Meredith et al.

(10) Patent No.: US 7,765,909 B2
(45) Date of Patent: *Aug. 3, 2010

(54) SLIDING SAW

(75) Inventors: Daryl Meredith, Hampstead, MD (US);
D. Scott Evans, Cockeysville, MD (US);
Robert Gifford, New Freedom, PA
(US); Sean Flickenger, Felton, PA (US)

(73) Assignee: Black & Decker Inc., Newark, DE (US)

( * ) Notice: Subject to any disclaimer, the term of this patent is extended or adjusted under 35 U.S.C. 154(b) by 81 days.

This patent is subject to a terminal disclaimer.

(21) Appl. No.: 10/393,662

(22) Filed: Mar. 21, 2003

(65) Prior Publication Data

US 2003/0140759 A1    Jul. 31, 2003

Related U.S. Application Data

(63) Continuation of application No. 09/757,022, filed on Jan. 8, 2001, now Pat. No. 6,561,068, which is a continuation of application No. 09/038,662, filed on Mar. 11, 1998, now abandoned.

(51) Int. Cl.
*B23D 45/04* (2006.01)
(52) U.S. Cl. .................. 83/471.3; 83/472; 83/486.1
(58) Field of Classification Search ............. 83/471.3, 83/486.1, 468.3, 472, 473, 565, 489, 490, 83/759, 544, 471, 471.1, 471.2, 581
See application file for complete search history.

(56) References Cited

U.S. PATENT DOCUMENTS

| 4,452,117 | A | * | 6/1984 | Brickner et al. | 83/471.3 |
| 4,537,105 | A | * | 8/1985 | Bergler | 83/471.3 |
| 4,934,233 | A | * | 6/1990 | Brundage et al. | 83/471.3 |
| 5,063,805 | A | * | 11/1991 | Brundage | 83/468.3 |
| 5,146,826 | A | * | 9/1992 | Shiotani et al. | 83/471.3 |
| 5,181,448 | A | * | 1/1993 | Terpstra | 83/468.3 |
| 5,564,323 | A | * | 10/1996 | Sasaki et al. | 83/471.3 |

* cited by examiner

*Primary Examiner*—Stephen Choi
(74) *Attorney, Agent, or Firm*—Adan Ayala

(57) ABSTRACT

An improved sliding saw includes a base, a rotatable table rotatably disposed within the base, a first rail fixedly attached at least partially underneath and extending forwardly from the table, and a saw unit slidably disposed on the first rail, wherein a user moves the saw unit along the first rail towards the table to perform a cutting operation. A second embodiment of the saw includes a table having a top surface, the top surface having a first plane, a fence attached to the table, the fence having a front surface extending along a plane substantially perpendicular to the first plane, a first rail fixedly attached at least partially underneath and extending forwardly from the table along a first direction, and a saw unit slidably disposed on the first rail, wherein a user moves the saw unit along the first direction towards the table to perform a cutting operation. Preferably, the fence is rotatably attached to the table. The fence preferably includes a left portion disposed generally on the left side of the saw unit, and a right portion disposed generally on the right side of the saw unit.

6 Claims, 4 Drawing Sheets

US 7,765,909 B2

SLIDING SAW

CROSS-REFERENCE TO RELATED APPLICATIONS

The present application is a continuation of U.S. application Ser. No. 09/757,022, filed Jan. 8, 2001, now U.S. Pat. No. 6,561,068, which is in turn a continuation of U.S. application Ser. No. 09/038,662, filed on Mar. 11, 1998, now abandoned.

FIELD OF THE INVENTION

This invention relates generally to sliding saws.

BACKGROUND OF THE INVENTION

A typical sliding saw includes a base, a rotatable table rotatably disposed within the base, a support housing attached to the table, a rail slidingly received by the support housing and a saw unit fixedly attached to the rail. The rail typically carries most, if not all, of the saw unit's weight, which is typically heavy. The support housing, which supports the rail, must accordingly have very expensive bearings, in order to support the weight and allow the different sliding motions.

During operation, the user pulls the saw unit towards the front of the saw and over the workpiece, moves the saw unit downwardly in a chopping motion, and pushes the saw unit towards the rear of the saw and into the workpiece. Accordingly, the prior art saws are not user friendly to operate.

It is therefore an object of this invention to provide a sliding saw that is less expensive to manufacture.

It is also an object of this invention to provide a sliding saw that can be more user friendly to operate.

SUMMARY OF THE INVENTION

In accordance with the present invention, an improved sliding saw is employed. The saw comprises a base, a rotatable table rotatably disposed within the base, a first rail fixedly attached at least partially underneath and extending forwardly from the table, and a saw unit slidably disposed on the first rail, wherein a user moves the saw unit along the first rail towards the table to perform a cutting operation.

A second embodiment of the saw comprises a table having a top surface, the top surface having a first plane, a fence attached to the table, the fence having a front surface extending along a plane substantially perpendicular to the first plane, a first rail fixedly attached at least partially underneath and extending forwardly from the table along a first direction, and a saw unit slidably disposed on the first rail, wherein a user moves the saw unit along the first direction towards the table to perform a cutting operation. Preferably, the fence is rotatably attached to the table. The fence preferably includes a left portion disposed generally on the left side of the saw unit, and a right portion disposed generally on the right side of the saw unit.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

Figure 1:
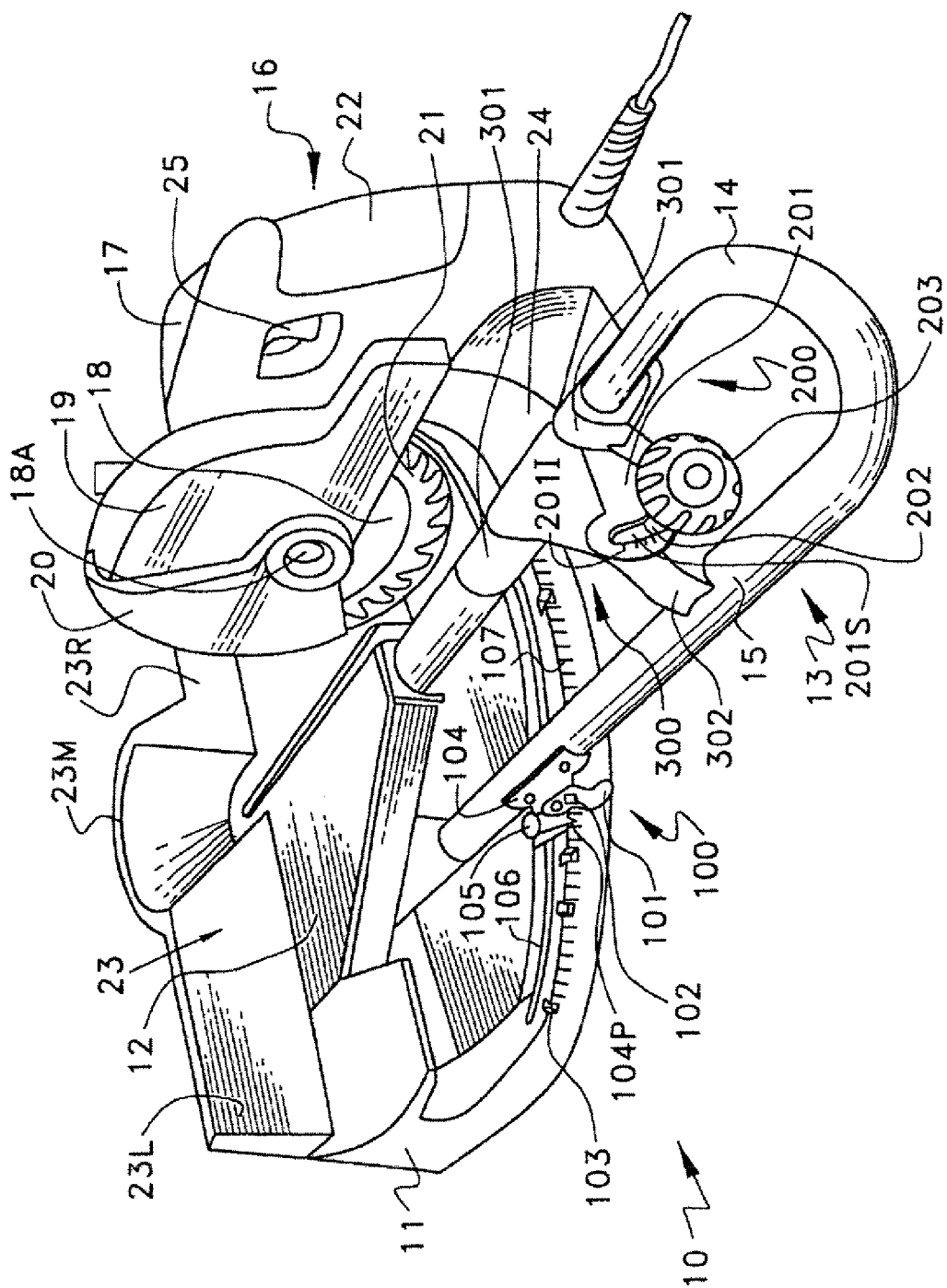
FIG. 1 is a perspective side view of a first embodiment of a sliding saw according to the present invention.

The invention is now described with reference to the accompanying figures, wherein like numerals designate like parts. FIG. 1 illustrates a first embodiment of the present invention, where slide saw 10 comprises a base 11 which rotatably supports a rotatable table 12. Table 12 is rotatably disposed on base 11 and can rotate about a vertical axis. Preferably base 11 is made of plastic, while table 12 is made of cast aluminum. The top surfaces of base 11 and table 12 may be coplanar.

Figure 2:
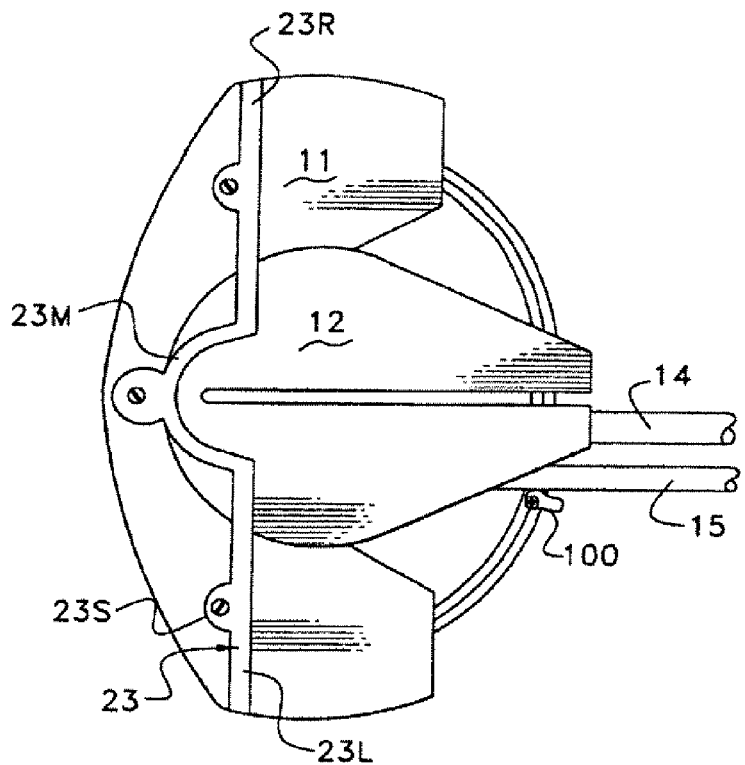
FIG. 2 is a partial plan view of the saw illustrated in FIG. 1.

Fence 23 is preferably fixedly attached to base 11 and has a left portion 23L, a right portion 23R and a middle portion 23M connecting the left and right portions 23L, 23R. As shown in FIG. 2, screws 23S disposed behind the left, middle and right portions 23L, 23M, 23R threadedly connect the fence 23 to base 11. It is preferable to provide a screw behind the middle portion 23M as it stiffens the middle portion 23M, requiring less material to be used there and/or less screws to hold the left and right portions 23L, 23R.

Referring to FIG. 1, saw unit 16 may include a blade arbor 18A, a blade 18 fixedly attached to arbor 18A, a motor 17 for driving the blade 18 and arbor 18A and an upper blade guard 19 for covering the uppermost region of blade 18. Persons skilled in the art shall recognize that saw unit 16 is preferably not pivotable along a chopping plane for cutting action. Instead, saw unit 16 is slidably disposed on table 12, allowing the user to push the saw unit 16 into a workpiece and towards fence 23 for cutting action. Handle 22 may be provided on saw unit 16 to facilitate the sliding action.

Persons skilled in the art will recognize that arbor 18A is preferably disposed at a location higher than the top surface of table 12. However, persons skilled in the art should recognize that arbor 18A may be disposed at a location lower than the top surface of table 12, yet still obtain the advantages of the present invention.

Preferably, rail assembly 13 is fixedly attached to table 12. Bolts may be used to screw the rail assembly 13 to table 12. Rail assembly 13 includes a first rail 14 and a second rail 15, which may be joined to each other. First and second rails 14, 15 may be attached to the underside of table 12.

Carriage assembly 300 is slidably disposed on first and second rails 14, 15. Carriage assembly 300 supports saw unit 16, allowing a user to move it along the first and second rails 14, 15. Saw unit 16 is disposed on carriage assembly 300.

Persons skilled in the art will recognize that means other than rail assembly 13 may be used to allow saw unit 16 to be moved towards fence 23. For example, table 12 may have an extruded track extending forwardly, slidably carrying carriage 300 and saw unit 16. Persons skilled in the art, however, should recognize that such other means are fixedly disposed or attached to table 12, as opposed to slidably disposed or attached to table 12, in order to be less expensive to manufacture. Preferably, such track would be partly below the top surface of table 12.

Saw unit 16 may also include an actionable lower blade guard 20 and a movable lower blade guard 21 for covering the lowermost region of blade 18. Actionable guard 20 may be actuated by the trigger switch 25 or by a separate lever.

Accordingly, when the user squeezes the trigger 25, the guard 20 will retract, exposing the blade.

Figure 3A:
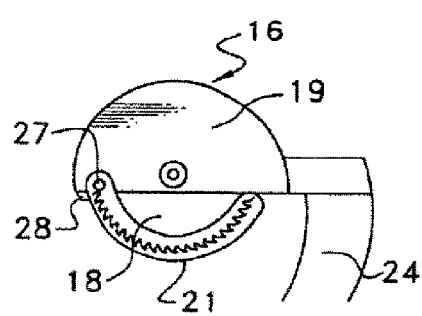
FIGS. 3A and 3B are partial side views of the blade guard mechanism.
Figure 3B:
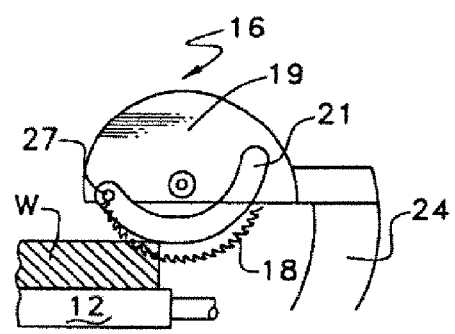

As shown in FIGS. 3A and 3B without guard 20, a movable guard 21 may be pivotally attached to upper blade guard 19 by pin 27. A stop 28 prevents guard 21 from exposing the blade 18. Accordingly, as the user pushes the saw unit towards 16 workpiece W, guard 21 will cover blade 18. When guard 21 contacts workpiece W, guard 21 pivots about pin 27, exposing blade 18 for cutting operation.

Saw unit 16 may also include a riving knife 24. Riving knife 24 may be designed so as to partly support the saw unit 16.

Carriage assembly 300 preferably includes a support portion 301 for slidably supporting the saw unit 16, and a position portion 302. Preferably, both support and position portions 301, 302 have bearings (not shown) to facilitate the sliding movement along the rail assembly 13. As shown in FIG. 1, support portion 301 preferably slides along first rail 14, while position portion 302 slides along both first and second rails 14, 15. Preferably, first rail 14 is disposed underneath table 12 so that portions 301 and 302 clear the table 12. This allows the user to slide carriage assembly 300 underneath the table 12, increasing the travel distance of saw unit 16 and thus the capacity of the saw.

Having at least two portions in carriage assembly 300 allows alteration the angle of blade 18 with respect to the plane of table 12, i.e., the bevel angle. When saw unit 16 is beveled, saw unit 16 and support portion 301 preferably rotate about the longitudinal axis of first rail 14. Having the bevel axis preferably underneath the top surface of table 12 provides significant savings in manufacturing, without substantially sacrificing accuracy. Position portion 302, however, remains in the same rotational position.

Saw unit 16 can be locked in a desired bevel position by use of bevel lock mechanism 200. Bevel lock mechanism 200 comprises a bevel plate 201 attached to support portion 301. Bevel plate 201 includes a slot 201S and may also include bevel angle indicia 201I, to indicate the bevel angle. A screw 202 is fixedly attached to or integrally formed on position portion 302 and inserted through slot 201S. A knob 203 then threadingly receives screw 202. Accordingly, to lock a desired bevel position, the user need only rotate knob 203 until plate 201 is firmly sandwiched between knob 203 and position portion 302.

As mentioned above, the angle of table 12 in relation to base 11 (and fence 23), i.e., the miter angle, may be changed. A miter detent mechanism 100 may be used to easily select commonly desired miter angles. The mechanism 100 comprises a main body 104 fixedly attached to second rail 15. Preferably, main body 104 is disposed so as to not interfere with the movement of portion 302 along second rail 15.

Main body 104 has a resilient spring lever 101 fixedly attached thereto. Spring lever 101 has a protrusion 102 in its underside. Protrusion 102 is normally biased against base 11 because of the resiliency of spring lever 102.

Accordingly, as the user changes the miter angle, protrusion 102 rides on base 11. Protrusion 102 will then engage a miter detent notch 103 disposed on base 11. If the user wants a different miter angle, he needs only to lift lever 101 and move table 12. Protrusion 102 will ride on base 11 until the next miter detent notch 103 is engaged.

Main body 104 may also carry a knob 105, which threadingly receives a screw (not shown). The screw extends through a notch 106 in base 11 and is fixedly attached to a T-strip or nut (not shown). Accordingly, if the user wants to lock the table 12 in a desired miter angle, the user need only rotate knob 105 until base 11 is firmly sandwiched between the T-strip and knob 105.

Main body 104 may also have a pointer 104P that indicates the miter angle by pointing at indicia 107 disposed on base 11.

Figure 4A:
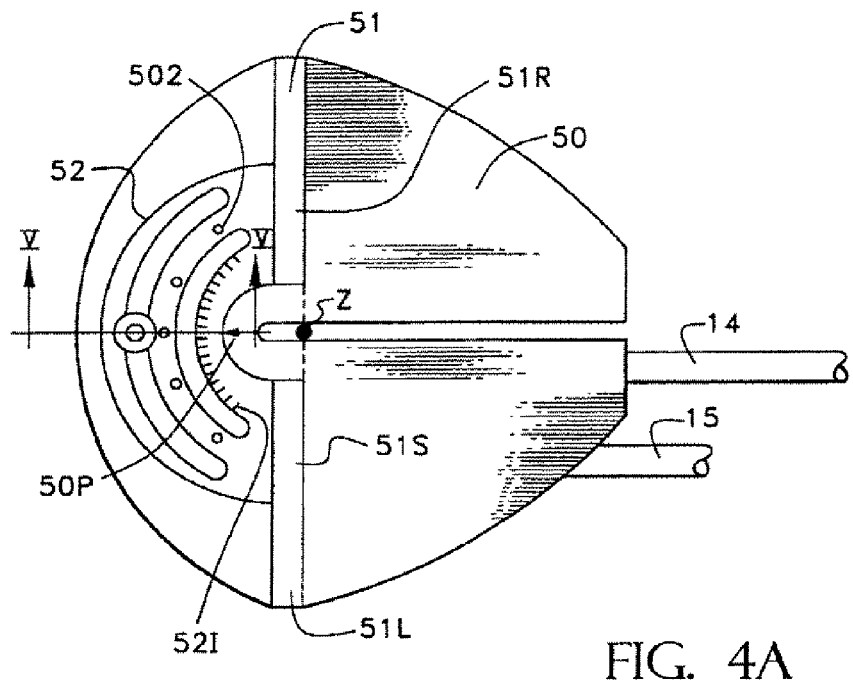
FIG. 4 is a partial plan view of a second embodiment of a sliding saw according to the present invention.
Figure 4B:
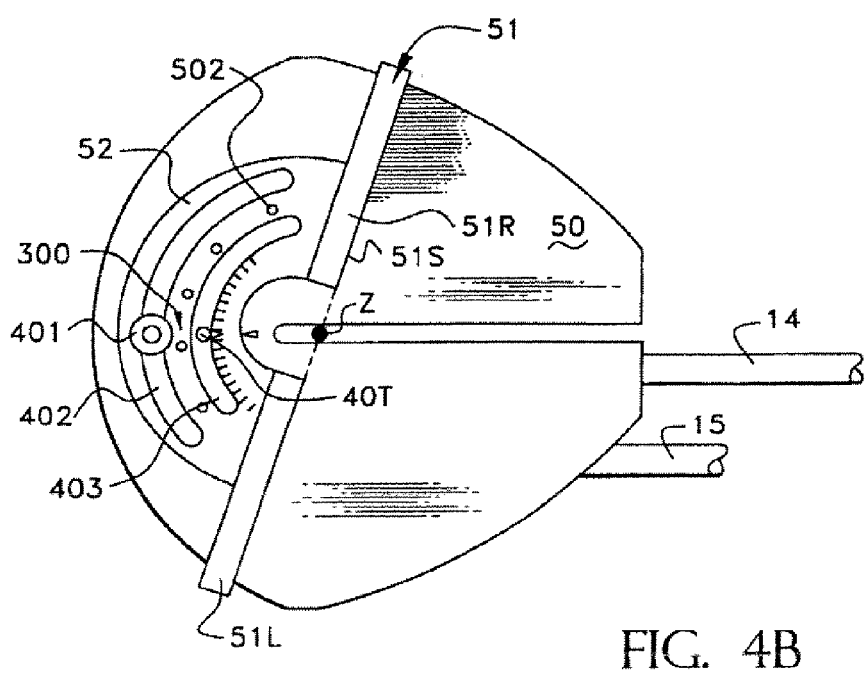

FIGS. 4A and 4B illustrate a second embodiment of the saw according to the present invention, where like numerals refer to like parts. As before, rails 14, 15 are fixedly attached to table 50. Table 50 does not rotate about a vertical axis, unlike the first embodiment. Instead, fence assembly 51 rotates about a vertical axis, providing the mitering capability.

Figure 5:
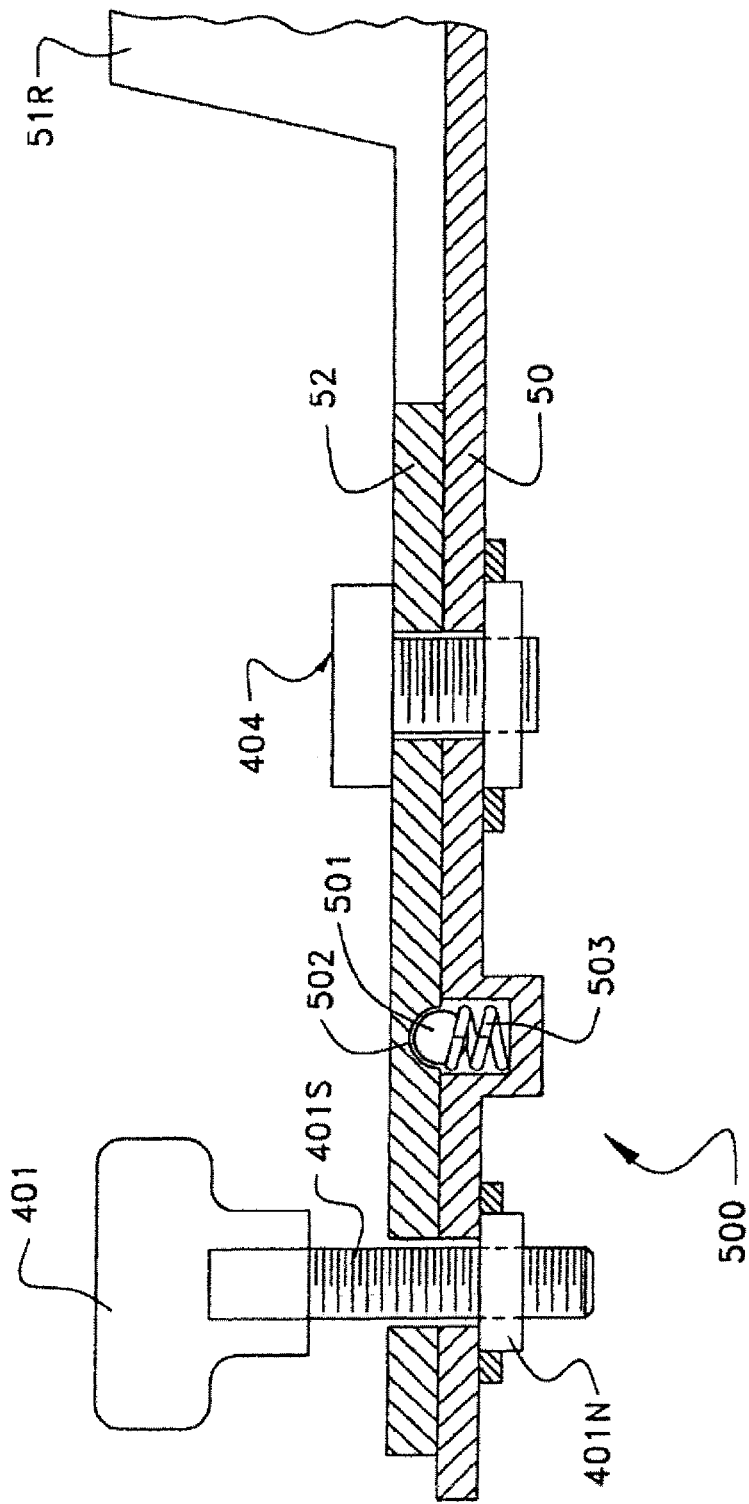
FIG. 5 is a cross-sectional view along line V-V of FIG. 4.

Fence assembly 51 preferably has a left portion 51L, a right portion 51R and a fence body 52 connecting the left and right portions 51L, 51R. Referring to FIGS. 4A, 4B, and 5, the fence body 52 has a semi-circular slot 402. The slot 402 receives a screw 401S. Screw 401S is fixedly disposed between fence body 52 and table 50. In addition, screw 401S may be fixedly connected to a knob 401 and threadingly engaged to a nut 401N. The fence body 52 has a second semi-circular slot 403, which is concentric to slot 402. A pin 404 is fixedly disposed between fence body 52 and table 50.

Because of this construction, fence assembly 51 will slide along slots 402, 403. Also because slots 402, 403 are concentric, fence assembly 51 will effectively pivot about an axis Z, providing an accurate miter angle. Preferably, axis Z is coplanar with the fence face surfaces 51S. In order to lock fence assembly 51 in a desired miter angle, the user need only rotate knob 401 until fence body 52 is firmly sandwiched between knob 401 and table 50.

To properly indicate the miter angle, table 50 may have a pointer 50P disposed thereon, which points at indicia 511 disposed on fence body 52.

A detent mechanism 500 may be provided between table 50 and fence assembly 51 to easily select commonly desired miter angles. Detent mechanism 500 includes a ball 501 disposed on table 50, detent notches 502 disposed on the underside of fence body 52, and a spring 503 normally biasing the ball 501 against the underside of fence body 52. Accordingly, as the user changes the miter angle, ball 501 rides against fence body 52 until it engages a detent notch 502 disposed on fence body 52.

Again, persons skilled in the art will recognize that means other than rail assembly 13 may be used to allow saw unit 16 towards fence 51. For example, table 50 may have an extruded track extending forwardly, slidably carrying carriage 300 and saw unit 16. Persons skilled in the art, however, should recognize that such other means are fixedly disposed or attached to table 51, as opposed to slidably disposed or attached to table 51, in order to be less expensive to manufacture. Preferably, such track would be partly below the top surface of table 51.

Persons skilled in the art may recognize other alternatives to the means disclosed herein. However, all these additions and/or alterations are considered to be equivalents of the present invention.

What is claimed is:

1. A saw comprising:

a base;

a rotatable table for supporting a workpiece, the table being rotatably disposed on the base;

a saw assembly rotatably connected to the table, the saw assembly comprising a motor and a blade driven by the motor, the blade being movable along a cutting plane;

a fence assembly comprising a first fence disposed to the left of the blade and attached to the base via a first screw, the first fence defining a fence plane, a second fence disposed to the right of the blade and attached to the base via a second screw, the first and second fences defining a gap therebetween and being connected via a central portion disposed behind the gap and disposed between the first and second screws and at least partly above the table, the central portion having a protrusion extending substantially rearwardly and at least partly above the table for attaching the central portion being attached to the base at an attachment portion which is disposed behind the gap and is intersected by the cutting plane, so that a distance between the attachment portion and the fence plane is larger than a distance between the first screw and the fence plane.

2. The saw of claim 1, wherein the central portion is attached to the base via a third screw.

3. The saw of claim 1, wherein the saw assembly is movable towards the fence assembly.

4. The saw of claim 1, wherein the base has notches.

5. The saw of claim 4, wherein the notches receive a detent for determining the rotational position of the table relative to the base.

6. The saw of claim 1, wherein the saw assembly contacts a first rail.

* * * * *